(12) United States Patent
Zagrodnik et al.

(10) Patent No.: US 6,905,234 B2
(45) Date of Patent: Jun. 14, 2005

(54) TURN SIGNAL MOUNTING ASSEMBLY

(75) Inventors: Phillip J. Zagrodnik, Oconomowoc, WI (US); Todd S. Schaetz, Waldo, WI (US); Gregory S. Hahn, Franklin, WI (US); William A. Scheiding, Oak Creek, WI (US)

(73) Assignee: Harley-Davidson Motor Company Group, Inc., Milwaukee, WI (US)

( * ) Notice: Subject to any disclaimer, the term of this patent is extended or adjusted under 35 U.S.C. 154(b) by 89 days.

(21) Appl. No.: 10/404,729

(22) Filed: Apr. 1, 2003

(65) Prior Publication Data

US 2004/0194571 A1 Oct. 7, 2004

(51) Int. Cl.[7] ................................................. B62J 6/00
(52) U.S. Cl. ...................................... 362/474; 362/473
(58) Field of Search ................................ 362/287, 399, 362/418, 421, 473, 474, 488, 501; 74/551.8

(56) References Cited

U.S. PATENT DOCUMENTS

| | | | | |
|---|---|---|---|---|
| 1,735,212 A | * | 11/1929 | Pawsat | 362/473 |
| 3,950,727 A | * | 4/1976 | Smith | 362/473 |
| 5,580,152 A | * | 12/1996 | Carter | 362/474 |
| 5,820,254 A | * | 10/1998 | Duenas | 362/473 |

OTHER PUBLICATIONS

Engineering Drawings illustrating Harley–Davidson Directional Signal Mounting Assemblies, Available on 1982 and later Harley–Davidson Motorcycles, 2 pages.

* cited by examiner

Primary Examiner—Y. My Quach-Lee
(74) Attorney, Agent, or Firm—Michael Best & Friedrich, LLP

(57) ABSTRACT

A mounting assembly for adjustably supporting a turn signal from a motorcycle handlebar. The mounting assembly includes an L-shaped one-piece mounting bracket having a mounting end and a supporting end. The mounting end is coupled to the handlebar and the supporting end is spaced from the handlebar and defines a supporting bore. The supporting bore includes a reduced portion that defines a first engagement surface and a support shaft is received by the supporting bore and includes an externally threaded portion that supports the turn signal, and frusto-spherical portion that engages the first engagement surface. A set screw is received by the supporting bore and defines a second engagement surface that can be tightened against the frusto-spherical portion opposite the first engagement surface to clamp the second portion and to hold the turn signal substantially fixed.

23 Claims, 3 Drawing Sheets

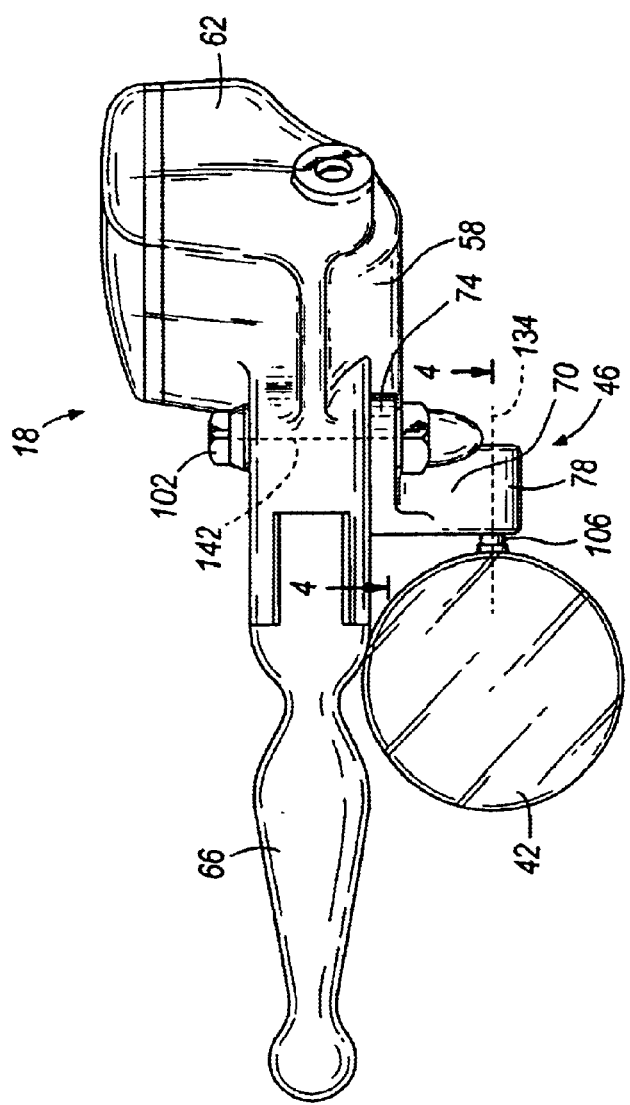
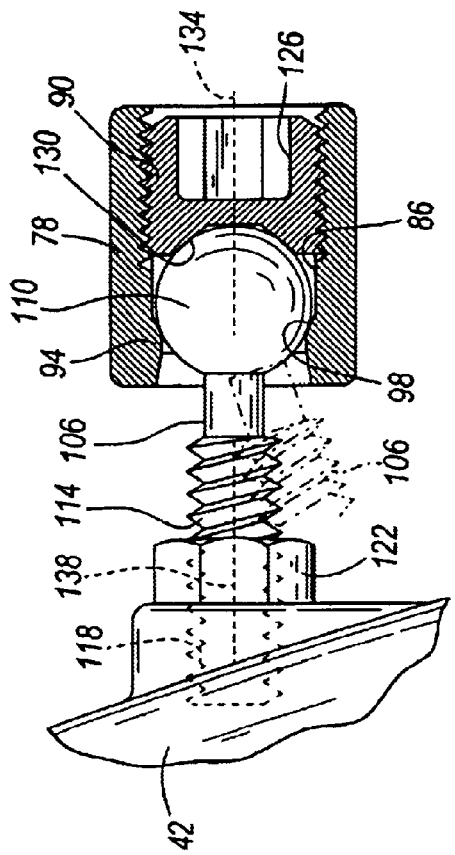

TURN SIGNAL MOUNTING ASSEMBLY

FIELD OF THE INVENTION

The present invention relates to an assembly for supporting turn signals from a vehicle, and more specifically to an assembly for supporting turn signals from a motorcycle handlebar.

BACKGROUND

Turn signals are provided on most road-going vehicles so that a vehicle operator can indicate his or her intention to turn, change lanes, or otherwise change direction. Various regulations exist relating to the size, shape, brightness and location of the turn signals for various types of vehicles. Although turn signals are generally a functional component of most vehicles, they can also be stylized such that the turn signals improve or compliment the overall aesthetics of the vehicle. In this regard, it is often desirable to locate the turn signals so as not to detract from the overall aesthetic appeal of the vehicle, while still complying with industry regulations.

In addition, when the turn signals are mounted to moveable or adjustable vehicle components (e.g. the handlebars of a motorcycle), the turn signals are preferably located such that they do not interfere with other vehicle components when moved through the range of motion of the moveable vehicle component. Furthermore, some vehicle components can be adjusted to suit the preferences of individual operators. In the event that the turn signals are mounted to such adjustable components, the turn signals are often mounted such that the relative position between the turn signals and the adjustable component can be changed to accommodate adjustments made by individual operators.

SUMMARY OF THE INVENTION

The present invention provides a mounting assembly for adjustably supporting a turn signal from a motorcycle handlebar. The mounting assembly preferably includes a one-piece mounting bracket having a mounting end and a supporting end. The mounting end is coupled to the handlebar and the supporting end is spaced from the handlebar and includes a supporting bore. The supporting bore has a generally cylindrical portion and a reduced portion that defines a first engagement surface. A support shaft is received by the supporting bore and includes a first portion that supports the turn signal, and second portion that engages the first engagement surface. A locking member is at least partially received by the supporting bore and defines a second engagement surface that is engageable with the second portion to clamp the second portion between the first and second engagement surfaces. Clamping of the second portion between the engagement surfaces holds the position of the turn signal with respect to the handlebar substantially fixed.

Other features of the invention will become apparent to those skilled in the art upon review of the following detailed description, claims, and drawings.

BRIEF DESCRIPTION OF THE DRAWINGS

FIG. 3 is a front view of a portion of the handlebar assembly illustrated in FIG. 1.

FIG. 4 is a section view taken along line 4—4 of FIG. 3.

Figure 1:
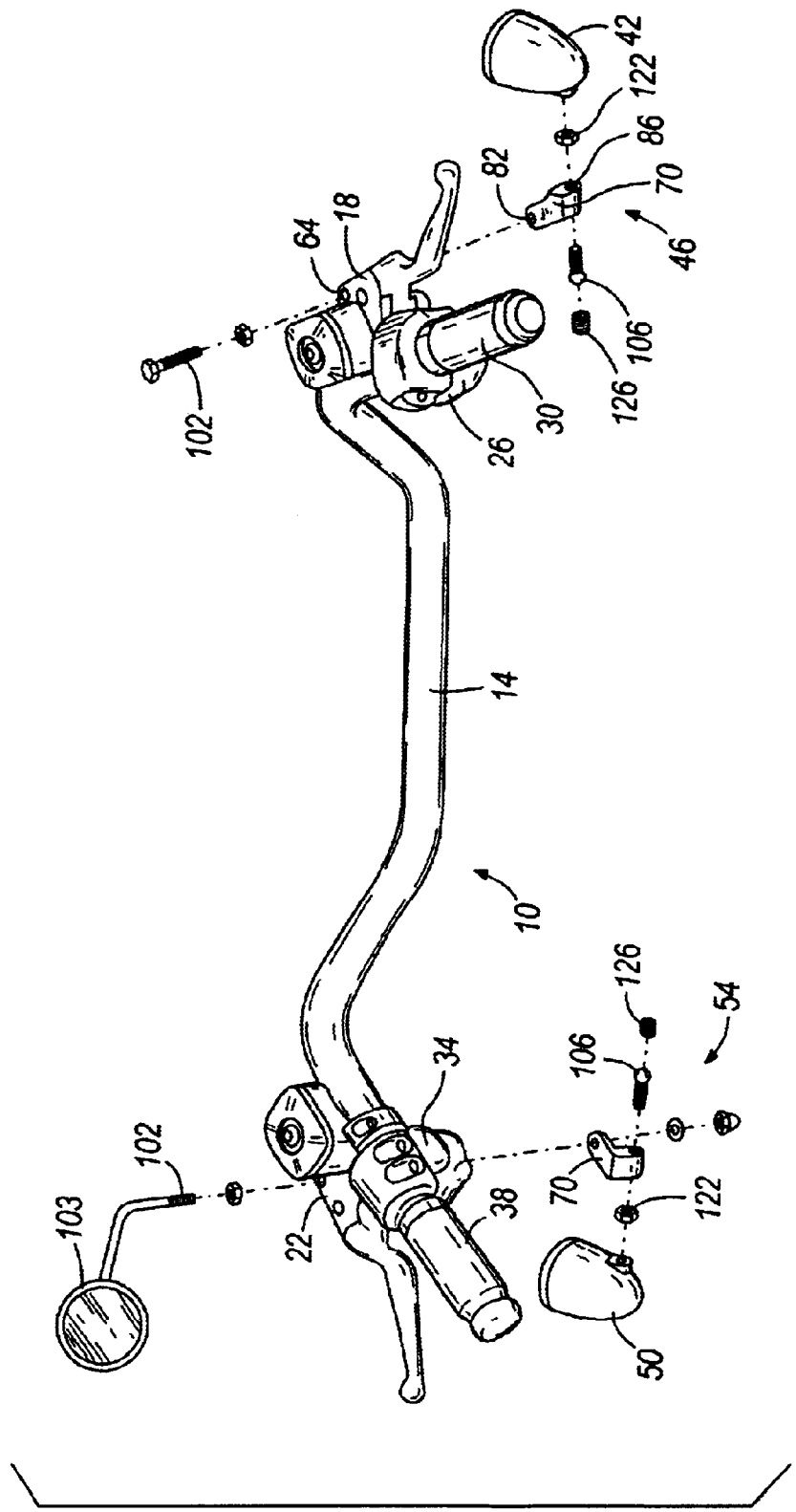
FIG. 1 is a perspective view of a motorcycle handlebar assembly including a turn signal mounting assembly embodying the invention.
Figure 2:
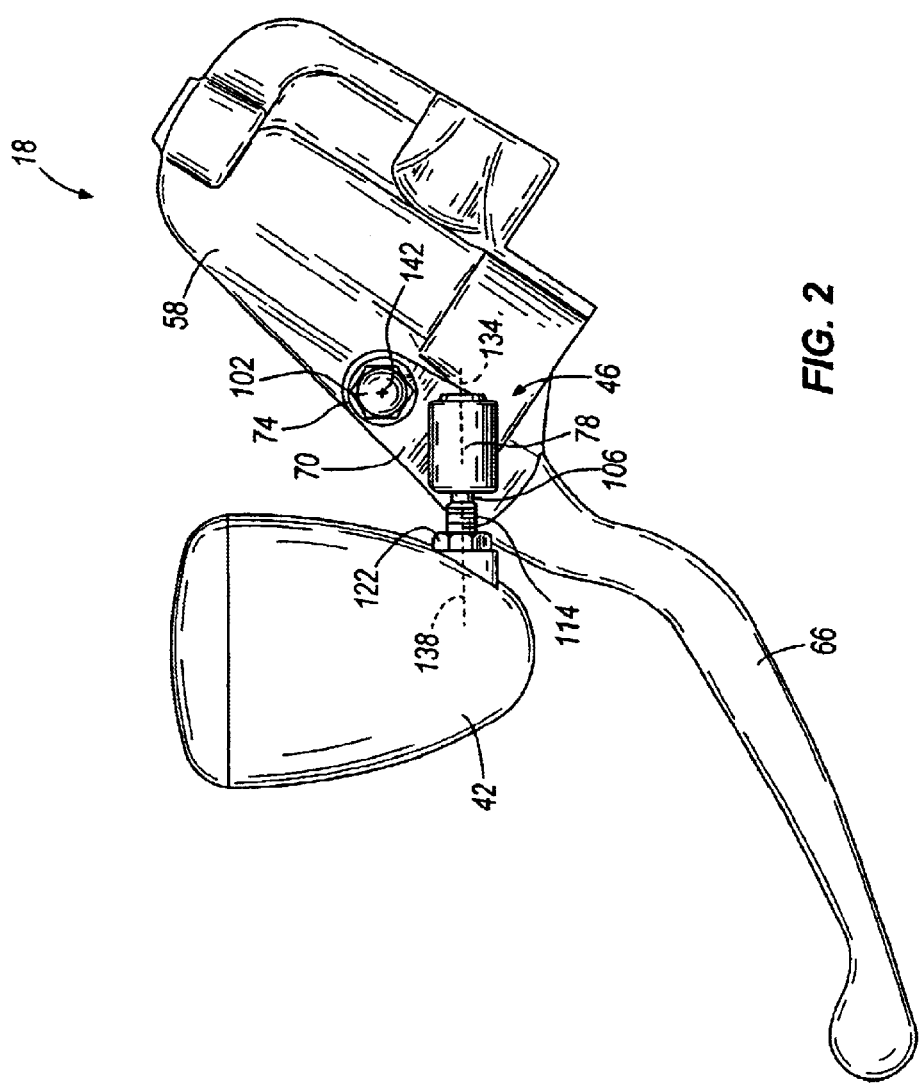
FIG. 2 is a bottom view of a portion of the handlebar assembly illustrated in FIG. 1.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION

FIG. 1 illustrates a motorcycle handlebar assembly 10 that can be secured in a known manner to a motorcycle for steering control. The handlebar assembly 10 includes a handlebar 14, a brake lever assembly 18 coupled to one end of the handlebar 14, and a clutch lever assembly 22 coupled to an opposite end of the handlebar 14. A first switch assembly 26 and a throttle control 30 are coupled to the handlebar 14 adjacent the brake lever assembly 18, and a second switch assembly 34 and a handgrip 38 are coupled to the handlebar 14 adjacent the clutch lever assembly 22. A first turn signal 42 is supported from the brake lever assembly 18 by a first mounting assembly 46, and a second turn signal 50 is supported from the clutch lever assembly 22 by a second mounting assembly 54. It should be appreciated that although the figures depict hydraulically operating brake and clutch lever assemblies 18, 22 that are similarly configured, the teachings of the present invention are also applicable to cable operating lever assemblies as well.

In the illustrated construction, certain components of the handlebar assembly 10, including the brake lever assembly 18, the clutch lever assembly 22, and the first and second switch assemblies 26, 34, are each independently mounted to the handlebar 14 in a known manner. In this regard, the relative positions of the components can be adjusted to suit the preferences of an individual operator. Furthermore, the handlebar 14 can also be adjusted relative to the motorcycle such that the position of the entire handlebar assembly 10 can be changed. To maintain proper orientation of the turn signals 42, 50 when the components of the handlebar assembly 10 are adjusted, the first and second mounting assemblies 46, 54 are configured to allow the position of the turn signals 42, 50 to be adjusted with respect to the remaining portions of the handlebar assembly 10. The first and second mounting assemblies 46, 54 operate and are configured in a similar manner, therefore only the first mounting assembly 46 is discussed further below. However, with respect to FIG. 1, components of the second mounting assembly 54 that are substantially the same or similar to components of the first mounting assembly 46 have been given like reference numerals.

Referring to FIGS. 1–4, the illustrated brake lever assembly 18 includes a body portion 58 that defines a fluid reservoir 62. The body portion 58 also defines a through hole 64 (FIG. 1) for supporting the turn signal 42 as discussed below. A brake lever 66 is pivotally coupled to the body portion 58 and is operable to actuate a piston (not shown) in a known manner to pump fluid from the fluid reservoir 62, thereby actuating the brakes of the motorcycle as is well known to those of ordinary skill in the art. It should be appreciated that the illustrated clutch lever assembly 22 is configured and operates similarly to the brake lever assembly 18, and is therefore not further discussed herein.

The first mounting assembly 46 includes a one-piece, generally L-shaped mounting bracket 70 that includes a mounting end 74 and a supporting end 78. The mounting end 74 defines an aperture 82 that is designed to be aligned with the through hole 64 in the body portion 58. The supporting end 78 defines a supporting bore 86 (FIG. 4) having a generally cylindrical internally threaded portion 90 and a reduced portion 94. The reduced portion 94 defines a substantially concaved first engagement surface 98 that faces the internally threaded portion 90.

A mounting fastener 102 extends through the through hole 64 and through the aperture 82 to couple the mounting bracket 70 to the brake lever assembly 18. The mounting fastener 102 can take on a variety of forms. For example, on the left side of the handlebar 14, the mounting fastener 102 is in the form of a mounting stud for a rear-view mirror assembly 103. The illustrated mounting stud comprises a threaded shaft that extends through the through hole 64 and the aperture 82 and is secured by an acorn nut. On the right side of the handlebar 14, the mounting fastener 102 is in the form of a bolt that similarly extends through the through hole 64 and the aperture 82 and also includes an acorn nut. It should be appreciated however that any other type of suitable fastener including pins, rivets, clamps, and the like can be used instead. In addition, one or both of the through hole 64 and the aperture 82 can be threaded such that the mounting fastener 102 can be coupled directly thereto, without the need for a nut.

A support shaft 106 includes a frusto-spherical end portion 110 that is received by the supporting bore 86 and engages the first engagement surface 98. The support shaft 106 also includes an externally threaded portion 114 that extends through the reduced portion 94 away from the internally threaded portion 90.

The turn signal 42 includes an internally threaded bore 118 that receives the externally threaded portion 114 of the support shaft 106. A lock nut 122 is positioned on the externally threaded portion 114 and can be secured against the turn signal 42 to inhibit relative movement between the turn signal 42 and the support shaft 106.

The mounting assembly 46 also includes a locking fastener in the form of a set screw 126. The set screw 126 is externally threaded and is at least partially received by the internally threaded portion 90 of the supporting bore 86. The set screw 126 defines a second substantially concaved engagement surface 130 that engages an opposite side of the frusto-spherical end portion 110 as the first engagement surface 98. The set screw 126 is adjustable between a tightened or locked position in which the support shaft 106 is held substantially fixed with respect to the mounting bracket 70, and a loosened or unlocked position in which the support shaft 106 is moveable with respect to the mounting bracket 70.

If the position of the brake lever assembly 18 or the handlebar 14 needs to be adjusted, the set screw 126 can be loosened such that the turn signal 42 can be repositioned accordingly. More specifically, the supporting bore 86 defines a first axis 134 and the support shaft 106 defines a second axis 138 (see FIG. 4). When the set screw 126 is in the locked position, an angle between the first and second axes is substantially fixed. However, when the set screw 126 is in the unlocked position, the angle can be changed, as indicated by the dashed line representation of the support shaft 106 in FIG. 4. The mounting bracket 70 is configured such that the first axis 134 is substantially perpendicular to a third axis 142 defined by the through hole 64 when the mounting bracket 70 is coupled to the brake lever assembly 18.

Although the illustrated mounting assemblies 46, 54 are supported by a brake lever assembly 18 and a clutch lever assembly 22 respectively, it should be appreciated that the mounting assemblies 46, 54 can be supported by substantially any portion of the handlebar assembly 10. Each component of the handlebar assembly 10 (e.g. the brake and clutch lever assemblies 18, 22, the switch assemblies 26, 34, the throttle control 30, the handgrip 38, and the handlebar 14, as well as additional components) generally comprises a control component of the motorcycle. That is, each component of the handlebar assembly 10 is or can be used to maneuver, manipulate, or otherwise provide operator control of some portion of the motorcycle. The adjustability of the turn signals 42, 50 provided by the mounting assemblies 46, 54 compensates for any positional adjustments made to any of the control components to suit the preferences of an individual operator.

While the invention has been described above in connection with a motorcycle handlebar assembly, the teachings of the present invention can also be applied to other vehicle types such as ATVs, scooters, three-wheeled vehicles, and substantially any other vehicle equipped with turn signals, without limitation. Furthermore, it is not required that the mounting assemblies 46, 54 be mounted to the handlebars or steering components of the vehicle. Rather, the mounting assemblies 46, 54 can be used to adjustably support the turn signals from substantially any desired portion or location of the vehicle.

Various features of the invention are set forth in the following claims.

What is claimed is:

1. A motorcycle handlebar assembly comprising:

a handlebar;

a control component coupled to the handlebar and defining a through hole;

a mounting bracket having a mounting end and a supporting end, the mounting end defining an aperture that is substantially aligned with the through hole, and the supporting end including a supporting bore having an internally threaded portion and a reduced portion that defines a substantially concaved first engagement surface;

a mounting fastener extending through the through hole and the aperture to secure the mounting bracket to the control component;

a support shaft received by the supporting bore and including an externally threaded portion that extends from the supporting bore, and a frusto-spherical end portion that engages the first engagement surface;

a turn signal defining a threaded bore that receives the externally threaded portion of the support shaft; and a locking fastener threadably received by the supporting bore and defining a substantially concaved second engagement surface that engages the frusto-spherical end portion, wherein the locking fastener is adjustable between a locked position wherein the turn signal is substantially fixed with respect to the handlebar, and an unlocked position wherein the turn signal is movable with respect to the handlebar.

2. The handlebar assembly of claim 1, wherein the control component includes one of a clutch lever assembly and a brake lever assembly.

3. The handlebar assembly of claim 1, wherein the mounting bracket is a single piece.

4. The handlebar assembly of claim 1, wherein the mounting bracket is generally L-shaped.

5. The handlebar assembly of claim 1, wherein the supporting bore defines a first axis and the support shaft defines a second axis, and wherein when the locking fastener is in the locked position an angle between the first axis and the second axis is substantially fixed, and when the locking fastener is in the unlocked position the angle can be adjusted.

6. The handlebar assembly of claim 5, wherein the aperture defines a third axis that is substantially normal to the first axis.

7. The handlebar assembly of claim 1, wherein the first engagement surface faces the internally threaded portion.

8. The handlebar assembly of claim 1, wherein the first engagement surface engages a first side of the frusto-spherical end portion, and the second engagement surface engages a second side of the frusto-spherical end portion, and wherein the externally threaded portion of the support shaft extends from the first side of the frusto-spherical end portion.

9. A mounting assembly for adjustably supporting a turn signal from a motorcycle handlebar, the mounting assembly comprising:
   a one-piece mounting bracket having a mounting end and a supporting end, the mounting end coupled to the handlebar and the supporting end spaced from the handlebar and including a supporting bore having a generally cylindrical portion and a reduced portion that defines a first engagement surface;
   a support shaft received by the supporting bore and including a first portion that supports the turn signal, and second portion that engages the first engagement surface; and
   a locking member at least partially received by the supporting bore and defining a second engagement surface that engages the second portion to clamp the second portion between the first and second engagement surfaces and to thereby substantially fix the position of the turn signal with respect to the handlebar.

10. The mounting assembly of claim 9, wherein the supporting bore defines a first axis and the support shaft defines a second axis, and wherein the locking member is adjustable between a locked position wherein an angle between the first axis and the second axis is substantially fixed, and an unlocked position wherein the angle can be adjusted.

11. The mounting assembly of claim 10, further comprising a control component coupled to the handlebar and defining a through hole, and a mounting fastener, wherein the mounting end defines an aperture that is substantially aligned with the through hole and defines a third axis that is substantially normal to the first axis, and wherein the mounting fastener extends through the through hole and the aperture to couple the mounting bracket to the control component.

12. The mounting assembly of claim 11, wherein the control component includes one of a clutch lever assembly and a brake lever assembly.

13. The mounting assembly of claim 9, wherein the cylindrical portion of the supporting bore is internally threaded and wherein the locking member is externally threaded.

14. The mounting assembly of claim 9, wherein the first portion is externally threaded and is threaded into the turn signal, and wherein the second portion is substantially frusto-spherical.

15. The mounting assembly of claim 14, wherein the first and second engagement surfaces are substantially concaved for engagement with the frusto-spherical second portion.

16. The mounting assembly of claim 9, wherein the first engagement surface engages a first side of the second portion, and the second engagement surface engages a second side of the second portion, and wherein the first portion of the support shaft extends from the first side of the second portion.

17. A mounting assembly for adjustably supporting a turn signal from a motorcycle handlebar, the mounting assembly comprising:
   a one-piece mounting bracket having a mounting end coupled to the handlebar and defining a mounting aperture, the mounting aperture defining a first axis, and a supporting end spaced from the handlebar and defining a supporting bore including a generally cylindrical portion and a reduced portion that defines a first engagement surface, the supporting bore defining a second axis that is substantially normal to the first axis;
   a support shaft received by the supporting bore and including a first portion that supports the turn signal, and second portion that engages the first engagement surface; and
   a locking member at least partially received by the supporting bore and defining a second engagement surface that engages the second portion to clamp the second portion between the first and second engagement surfaces and to thereby substantially fix the position of the turn signal with respect to the handlebar.

18. The mounting assembly of claim 17, wherein the one-piece mounting bracket is generally L-shaped.

19. The mounting assembly of claim 17, wherein the support shaft defines a third axis, and wherein the locking member is adjustable between a locked position wherein an angle between the second axis and the third axis is substantially fixed, and an unlocked position wherein the angle can be changed.

20. The mounting assembly of claim 17, further comprising a mounting fastener that extends through the mounting aperture to couple the mounting bracket to the handlebar.

21. The mounting assembly of claim 17, wherein the cylindrical portion of the supporting bore is internally threaded and wherein the locking member is externally threaded.

22. The mounting assembly of claim 17, wherein the first portion is externally threaded and is threaded into the turn signal, and wherein the second portion is substantially frusto-spherical.

23. The mounting assembly of claim 22, wherein the first and second engagement surfaces are substantially concaved for engagement with first and second sides of the second portion, respectively, and wherein the first portion of the support shall extends from the first side of the frusto-spherical second portion.

* * * * *